March 14, 1967　　　J. D. PHIPPS　　　3,309,687
FLOAT-OPERATED LIQUID LEVEL SENSING DEVICE
Filed Feb. 23, 1962
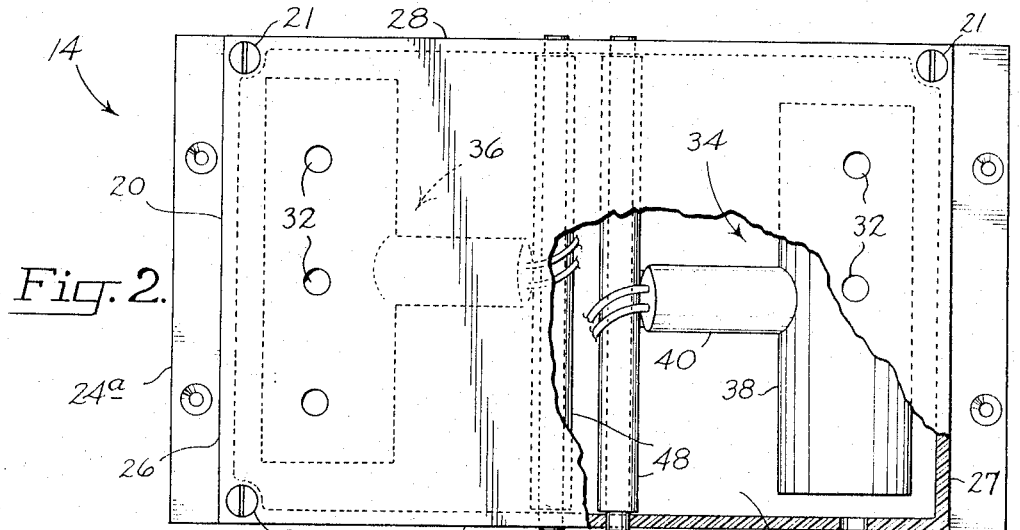
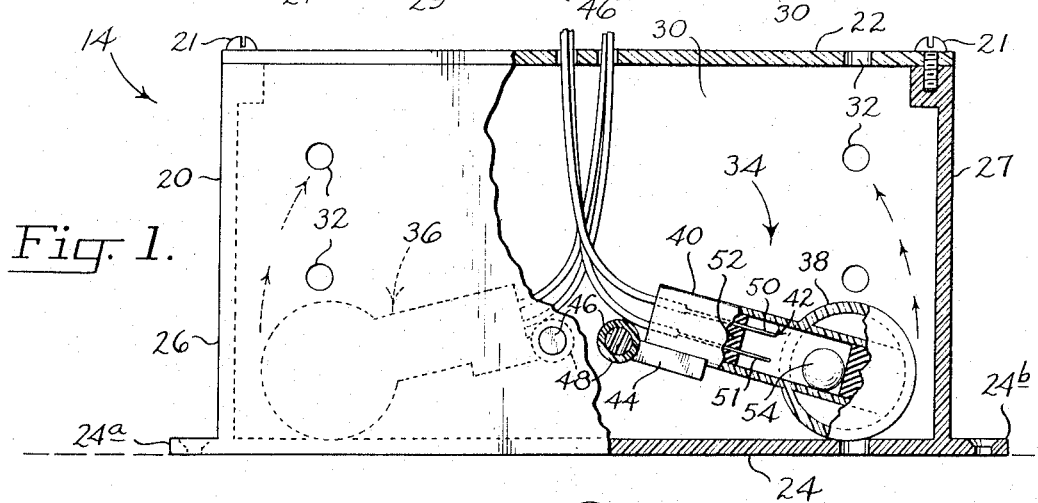
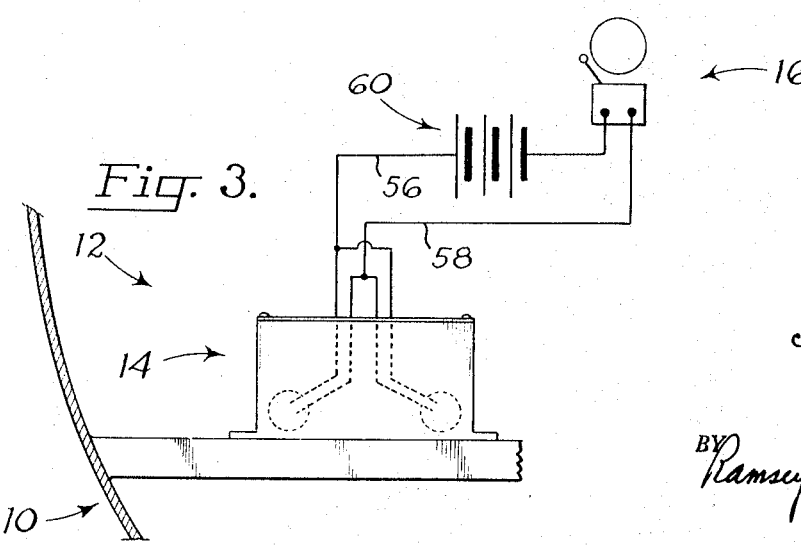
John D. Phipps.
INVENTOR.
BY Ramsey, Kolisch + Hartwell
Attys.

United States Patent Office 3,309,687
Patented Mar. 14, 1967

3,309,687
FLOAT-OPERATED LIQUID LEVEL
SENSING DEVICE
John D. Phipps, 6517 N. Commercial Ave.,
Portland, Oreg. 97217
Filed Feb. 23, 1962, Ser. No. 175,045
3 Claims. (Cl. 340—244)

This invention relates to sensing devices, and more particularly to liquid level sensing devices that may be used, for instance, to sense water level in a boat with the device producing a warning signal when the water level reaches a certain height.

Leakage in the hulls of boats is always a problem. Pleasure boats, for instance, whether they have wooden, steel or other types of hulls, may develop leakage that, with the boat moving, is not discernible until the boat becomes logy and fails to respond properly to its controls. When such occurs, a considerable amount of bilge water may have already collected in the boat. Boats also may develop leakage while moored that results in their taking on a considerable amount of water, enough to sink the boat if the leakage is not discovered.

One of the objects of this invention, therefore, is to provide a simple and practical sensing device, that boat owners may use for the purpose of warning them when the water level in a boat has reached a dangerous height.

For the device to offer the utmost in protection for a boat owner, it is important that the device operate with a high degree of reliability. Further, the device should not be easily tampered with whereby its operation is impaired. It is another object of the invention to provide a sensing device that is reliable and easily inspected for the purpose of checking its operation.

In general terms, the device of this invention comprises a pair of float elements mounted within a protective casing. The latter has perforate walls to accommodate the flow of water into the casing. The float elements, instead of responding to high water by being buoyed upwardly in a confined vertical guideway (where their movement could be affected by foreign matter wedging between the elements and the guideway), have their movement controlled by arms joined to the elements and pivotally mounted within the casing for pivotal movement about horizontal axes ordinarily extending longitudinally of the boat. In the absence of water, the float elements rest on the base of the casing, where the support rendered by the base functions to eliminate the wear that would result were the elements continuously suspended. Each float element is provided with an electrical switch, and upon a rise of water level in a boat, the elements swing upwardly, with actuation of the switches and energizing of an appropriate warning device. The switches are surrounded by a transparent covering, and the casing preferably also is transparent, so that at all times they are visible from outside the casing, thus to enable them to be checked for reliability. Two float elements are provided, with their switches electrically in parallel, to assure certainty of actuation of the warning device in the event of a water level rise.

Thus, other objects of the invention include: the provision of a level sensing device that comprises a float element and pivot means mounting it within a casing, with the element actuating a warning device upon being buoyed upwardly, the provision of such a sensing device that includes a pair of such elements operating switches electrically in parallel, the provision of such a device where the float elements rest on a support during periods of nonactuation, the provision of such a device where the float elements and their pivot mountings are entirely contained within a protective casing which may be mounted in stationary position within a boat, and the provision of such a device where a visual check is afforded of operating parts therein.

It is also an object of the inventon to provide, in combination with a boat, a novel bilge water sensing device that, while operable to detect a rise in water level, will tend not to be actuated for other causes, such as by the boat pitching in rough water.

These and other objects and advantages are attained by the invention, and the same is described hereinbelow in conjunction with the accompanying drawings, wherein:

FIG. 1 is a side view of a unit in the device that is ordinarily mounted near the base of a boat hull, and that includes a pair of float elements responsive to water level;

FIG. 2 is a plan view of the unit illustrated in FIG. 1; and

FIG. 3 is a view, somewhat simplified, showing a portion of a boat hull, and within the boat hull the level sensing device of the invention.

Referring now to the drawings, a portion of a boat hull is indicated generally at 10. Within the boat hull, and for sensing a rise in the level of bilge water therein, is the sensing device contemplated, and indicated generally at 12. The device comprises a unit 14, ordinarily mounted adjacent the base of the hull containing float elements (to be described) that are buoyed upwardly on a rise of water level, and a signaling or warning device, generally indicated at 16.

Considering now more spacifically unit 14, this comprises a casing 20, with top and bottom walls 22, 24, and side walls 26, 27, 28 and 29. The walls of the casing define within the casing a substantially rectangular chamber 30.

The walls of casing 20 are perforate, to accommodate the flow of water into the inside of the casing, that is to say, into chamber 30. Perforations are indicated at 32. Ordinarily these perforations may be provided in each of the walls of casing 20. A large enough size is selected for the perforations for them to be substantially free of clogging tendencies. The perforations, however, are not so large as to enable bulky pieces of foreign matter to be carried into the chamber, where they might hinder proper operation of movable parts therein. Perforations or holes of ⅛–⅜ inch diameter have been found practical.

Preferably the walls of casing 20 are made of transparent material, such as a transparent plastic (plastic material having the advantage of not being fragile, as is glass). This enables a boat owner visually to inspect the inside of the casing and check its condition, which is an important factor in the reliability of the device.

A pair of float members are disposed within chamber 30 and these are indicated at 34, 36. The two are similar in construction.

Considering for explanation purposes float member 34, the member comprises a float element 38 in the form of an elongated cylinder with closed ends. Extending out to one side of element 38 is a tube or arm 40, which houses a switch or switch means, indicated at 42 and mounted within the tube. Joined to tube 40 is an arm 44.

The float member is pivotally mounted within the casing. Thus, a rod 46 extends between opposed side walls 28, 29. Encircling rod 46 and within chamber 30 is a sleeve 48 having ends abutting the inside walls 26, 28. Arm 44 is joined to sleeve 48 approximately midway between its ends. The sleeve is rotatably mounted on rod 46, and thus provides a pivot connection where movement is limited to pivotal movement about an axis corresponding to the longitudinal axis of rod 46.

Tube 40 housing switch means 42, also referred to herein as a cover, is made of transparent material such as the transparent plastic of which the casing is made. Element 38 may be similarily constructed. The transparent nature of tube 40 enables switch 42 to be visible from outside casing 20. Thus, the switch also may be inspected visually without opening the casing, which is an aid in obtaining reliability in the device.

A mercury-type switch is shown for switch 42. The switch comprises a pair of contacts 50, 51, supported in a mounting 52 within tube 40. A deposit of liquid mercury is shown at 54. With the float member pivoted upwardly from the position shown in solid outline in FIG. 1, the mercury covers contacts 50, 51 to produce a closed circuit between them.

Warning device 16 comprises, in the embodiment illustrated, an electrically operated bell or buzzer. Obviously other types of warning devices may be utilized, if desired. Device 16 is connected to contacts 50, 51 of switch 42 by conductors 56, 58.

The other float member 36 includes a switch or switch means similar to switch 42, just described. Its switch contacts are also connected by conductors 56, 58 to warning device 16. The two switches are electrically in parallel, so that on either one being closed, the bell, or warning device, is energized.

The battery for powering device 16 is indicated at 60. With the two switches open, the circuit between the two terminals of the battery is open, and there is no drain on the battery. It is only when one and/or the other of the switches is closed that a drain is placed on the battery.

Completing the description of the device, bottom wall 24 of the casing extends outwardly to either side of the casing and terminates in flanges 24a, 24b. These accommodate mounting of the casing in the position desired in a boat. Unit 14 is mounted in a boat with the pivot axes of the float members substantially parallel to the longitudinal axis of the boat.

The operation of the device should be clear, but certain features now will be pointed out. As already indicated, the casing provides protection for the float members, and shields them from foreign matter, such as would impair their operation. The casing, as well as the tubes 40, are transparent, to allow for a visual check.

By mounting the unit so that the pivot axes of the float members extend longitudinally of the boat, the usual pitching of a boat will not produce actuation of the switches. However, when an increase in water level occurs, such will bring up the float members and produce closing of their switches. Movement of the float members is in a chamber with walls spaced so as not to confine the members. The sleeve and rod pivot connections contemplated provide a reliable type of pivot, and these pivot connections are also protected by the casing.

For complete safety, the device should be installed in a boat with no turn-off switches. The device is easily installed by the boat owner. Maintenance requirements of the device are minimal.

I claim:

1. In combination with a boat, a bilge water sensing device comprising a pair of float members, each of said float members including an elongated water-buoyant float element and an arm connected at one end to an intermediate portion of the float element extending out to one side of the element, said float elements occupying a substantial horizontal position within the casing which parallels the longitudinal axis of the boat, pivot means mounting the opposite end of the arm for each of said float member accommodation pivotal movement of the member with such movement limited to movement about an axis substantially paralleling the longitudinal axis of the boat, a perforate casing surrounding the float members and the pivot means mounting each, switch means on each of said float members actuated by pivotal movement of the member, an electrically operated warning device, and circuit means connecting the switch means of the two float members and said electrically operated warning device with the switch means electrically in parallel.

2. A liquid livel sensing device comprising a perforate casing with a pair of side walls, a base and a top defining an elongated substantially horizontal chamber within the casing,
   a pair of horizontal rod elements within the casing extending between and being supported by opposite side walls thereof,
   a sleeve encircling each of said rod elements and rotatably journaled thereon and bearing at each of its two ends against the opposite sides of said side walls,
   an arm connected at one end to an intermediate portion of each sleeve extending laterally outwardly thereof,
   an elongated, substantially horizontal, water-buoyant float element joined intermediate its ends to the other end of each arm, occupying a position paralleling said rod elements and normally resting on the base of said casing,
   switch means on each arm actuated by movement thereof,
   an electrically operated warning device outside the casing, and
   circuit means interconnecting the switch means on said arms and said warning device with said switch means electrically in parallel whereby on actuation of either switch means said warning device is operated.

3. A liquid level sensing device comprising a perforate casing with side walls, base and top defining an elongated substantially horizontal chamber within the casing,
   a pair of adjacent horizontal rod elements within the casing extending between opposite side walls thereof in a region located intermediate the ends of the casing,
   a sleeve encircling each of said rod elements and rotatably journaled thereon,
   an arm connected at one end to an intermediate portion of each sleeve extending laterally outwardly thereof,
   said arms projecting outwardly from each other from said sleeves and having ends opposite their said one end adjacent the ends of the casing,
   an elongated substantially horizontal, water-buoyant float element joined intermediate its ends to said opposite end of each arm, occupying a position paralleling said rod elements and normally resting on the base of said casing,
   said float elements being adjacent the ends of the casing,
   switch means housed within each arm and actuated by the movement thereof,
   an electrically operated warning device outside the casing, and
   circuit means interconnecting the switch means on said arms and said warning device with said switch means electrically in parallel whereby on actuation of either switch means said warning device is operated.

References Cited by the Examiner

UNITED STATES PATENTS

| | | | |
|---|---|---|---|
| 427,873 | 5/1890 | Jones | 200—84 |
| 766,811 | 8/1904 | Cogan. | |
| 868,254 | 10/1907 | Daniel | 200—84 |
| 1,348,015 | 7/1920 | Lee | 200—84 |
| 1,658,911 | 2/1928 | Varley. | |
| 1,712,665 | 5/1929 | Gregory | 340—244 X |
| 1,875,510 | 9/1932 | Shivers | 200—84 |
| 2,442,275 | 5/1948 | Mayer | 340—246 X |
| 2,816,973 | 12/1957 | Beck et al. | 340—244 X |
| 2,880,262 | 3/1959 | Bell et al. | 174—50 |
| 2,981,196 | 4/1961 | Zimmerman et al. | 200—84 X |
| 3,002,186 | 9/1961 | Schlangen | 200—84 X |

FOREIGN PATENTS 530,812  12/1940  Great Britain.

NEIL C. READ, *Primary Examiner.*

D. K. MYER, *Assistant Examiner.*